United States Patent [19]
Fujino et al.

[11] Patent Number: 5,743,618
[45] Date of Patent: Apr. 28, 1998

[54] OPTICAL AXIS ADJUSTMENT STRUCTURE FOR VEHICULAR LAMPS AND METHOD FOR ASSEMBLING SAME

[75] Inventors: Yuji Fujino; Osamu Sato, both of Shizuoka, Japan

[73] Assignee: Koito Manufacturing Co., Ltd., Tokyo, Japan

[21] Appl. No.: 665,397

[22] Filed: Jun. 18, 1996

[30] Foreign Application Priority Data

Jun. 28, 1995 [JP] Japan ................................ 7-183248

[51] Int. Cl.⁶ .............................. B60Q 1/00; B60Q 1/06; F16B 13/04
[52] U.S. Cl. ............................. 362/61; 362/66; 411/15; 411/39
[58] Field of Search .................. 362/61, 66; 411/39, 411/15; 264/318, 310

[56] References Cited

U.S. PATENT DOCUMENTS

| | | | |
|---|---|---|---|
| 3,741,067 | 6/1973 | Moran | 411/39 |
| 4,133,246 | 1/1979 | Small | 411/15 |
| 4,621,307 | 11/1986 | Weber | 362/66 |
| 4,689,725 | 8/1987 | Saijo et al. | 362/66 |
| 4,722,029 | 1/1988 | Ahle et al. | 362/66 |
| 4,894,754 | 1/1990 | Levilain | 362/66 |
| 5,003,436 | 3/1991 | Yamada et al. | 362/61 |
| 5,065,298 | 11/1991 | Osborn | 362/66 |
| 5,197,794 | 3/1993 | Scott et al. | 362/66 |
| 5,258,894 | 11/1993 | Bivens | 362/66 |
| 5,331,519 | 7/1994 | Fujino | 362/66 |
| 5,386,349 | 1/1995 | Wheat et al. | 362/66 |
| 5,526,238 | 6/1996 | Van Oel et al. | 362/66 |

*Primary Examiner*—Ira S. Lazarus
*Assistant Examiner*—Matthew Spark
*Attorney, Agent, or Firm*—Morgan, Lewis & Bockius LLP

[57] ABSTRACT

An optical axis adjustment structure which includes an aiming adjustment screw having a ball part disposed at one end thereof for receiving and being supported by a movable part of a lamp or the like, an intermediate part screw-engaging with a nut member fitted in a stationary part of a vehicle body or the like, and an operating part disposed at the other end thereof for a rotational operation, and the outer dimension of the operating part of the aiming adjustment screw is designed to be larger than the threaded intermediate part of the screw and the outer diameter of the ball part is larger than the diameter of the threaded part of the screw, while the nut member is integrally molded with the aiming adjustment screw at the intermediate part thereof.

21 Claims, 5 Drawing Sheets

OPTICAL AXIS ADJUSTMENT STRUCTURE FOR VEHICULAR LAMPS AND METHOD FOR ASSEMBLING SAME

FIELD OF THE INVENTION

The present invention relates generally to a vehicular lamp in which an optical axis of the lamp is adjustable with respect to the vehicle body. More particularly, the invention relates to an aiming adjustment structure using an aiming adjustment screw.

RELATED ART

Lamps such as vehicular headlamps or fog lamps require an aiming adjustment for adjusting an optical axis of a bulb serving as a light source, a reflector or a lamp unit with respect to the vehicle body. For example, in a case where an optical axis of a reflector installing thereon a bulb serving as a light source is adjustable with respect to a lamp body which is secured to the vehicle body, a part of the reflector is supported by the lamp body through a ball joint mechanism, and aiming adjustment sections are disposed on positions opposite the support section in both the vertical and horizontal directions. At the aiming adjustment sections, an aiming adjustment screw is supported screw-threadably on the lamp body while an end of the aiming adjustment screw is threadably engaged with the reflector. Then, by operating the aiming adjustment screw to rotate, the threadably engaging parts of the reflector moves in the front-rear direction with respect to the lamp body, so that the reflector inclines in the vertical and horizontal directions thereby to adjust the optical axis of the lamp.

FIG. 7 is a schematically sectional view showing the conventional aiming adjustment section 8 using the aiming adjustment screw of this type as disclosed, for example, in Unexamined Japanese Patent Publication No. Hei. 4-65004. The aiming adjustment section 8 includes a bracket 43 disposed on a back of a reflector 4 and a nut 81 fitted in a hole part of the bracket 43. On the other hand, an aiming adjustment screw 82 penetrates through a lamp body 1 while it is rotatably supported in a hole disposed in a back surface of the lamp body 1 facing the bracket 43. A threaded part 821 of the aiming adjustment screw 82 at an inner end side thereof screw-engages with the nut 81. On the other hand, an operating part 822 of the aiming adjustment screw 82 at an outer end side thereof is operatable from the outside the lamp. By rotating the aiming adjustment screw 82, the nut 81 screw-engaging with the aiming adjustment screw 82 slides in the axial direction of the aiming adjustment screw. As a result, the reflector 4 moves in the front-rear direction together with the bracket 43 and inclines with respect to the lamp body 1, thereby to adjust the optical axis of the reflector 4.

The conventional aiming adjustment structure is assembled by the following steps. First, the nut 81 is fitted in the hole formed in the bracket 43 of the reflector 4, then the threaded part 821 of the aiming adjustment screw 82 is screw-engaged with the nut 81. Afterwards, the operating part 822 of the aiming adjustment screw 82 is inserted through the hole formed in the lamp body 1 from the inner side thereof until the lamp body 1 comes into abutment against a stopper 823 disposed on the aiming adjustment screw 82. A washer 824 or the like is engaged with an outer end portion of the aiming adjustment screw 82 at outside the lamp body 1 and, thereafter, a stopper 825 such as a push-on-fix (O-ring like fixing member) is secured to the aiming adjustment screw 82 over the washer 824.

However, with the conventional structure of the aiming adjustment section, it is necessary to assemble the parts such as the washer 824, stopper 825 and the like as well as the other parts for water-proofing such as a seal ring 826 during the assembly, particularly while the aiming adjustment screw 82 is to be supported on the lamp body 1. Therefore, the large number of parts and many steps of assembling a single lamp is required, thereby causing the workability to be complicated.

Further, since the aiming adjustment screw is inserted into the hole formed in the lamp body from the outer end part of the screw, it is difficult to design the diameter of the operating part 822 of the aiming adjustment screw 82 to be larger than that of the threaded part thereof. For this reason, operators have been required to operate the aiming adjustment with operating part 822 having a small diameter. Thus the workability for the aiming adjustment operation is not good.

SUMMARY OF THE INVENTION

The present invention was made in view of the foregoing difficulties or problems accompanying the conventional aiming adjustment structure. Therefore, an object of the present invention is to provide an aiming adjustment structure capable of reducing the number of parts which constitute the structure and reducing the steps of assembling an aiming adjustment screw, which contribute to easy aiming adjustment operations.

Another object of the invention is to provide a method for assembling an aiming adjustment structure capable of reducing the number of parts which constitute the structure and reducing the steps of assembling an aiming adjustment screw, which contribute to easy aiming adjustment operations.

The above and other objects can be achieved by a provision of an optical axis adjustment structure which, according to the present invention, includes an aiming adjustment screw having a ball part disposed at one end thereof for receiving and being supported by a movable part of a lamp or the like, an intermediate part screw-engaging with a nut member fitted in a stationary part of a vehicle body or the like, and an operating part disposed at the other end thereof for a rotational operation. The outer dimension of the operating part of the aiming adjustment screw is designed to be larger than the threaded intermediate part of the screw and the outer diameter of the ball part is larger than the diameter of the threaded part of the screw, while the nut member is integrally molded with the aiming adjustment screw at the intermediate part thereof.

According to the method of the present invention, a ball part of the aiming adjustment screw which is integrally formed with the nut member engages with the ball receptacle member, next, the ball receptacle member is fitted in the fitting hole formed in the bracket of the reflector, afterwards, the reflector is installed within the lamp body and, at the same time, the operating part of the aiming adjustment screw is inserted through the nut receiving hole 12 of the lamp body, so that the nut member is engaged with the nut receiving hole, the wing pieces of the nut member is fitted in the nut receiving hole so that the nut member is fixedly engaged with the nut receiving hole.

Since the nut member is integrally molded with the aiming adjustment screw, and merely the nut member is fitted in the stationary member for supporting the aiming adjustment screw, the required steps for assembling the aiming adjustment section are extremely decreased and, therefore, the workability can be improved.

DESCRIPTION OF THE PREFERRED EMBODIMENTS

The present invention will now be described in detail with reference to accompanying drawings.

Figure 1:
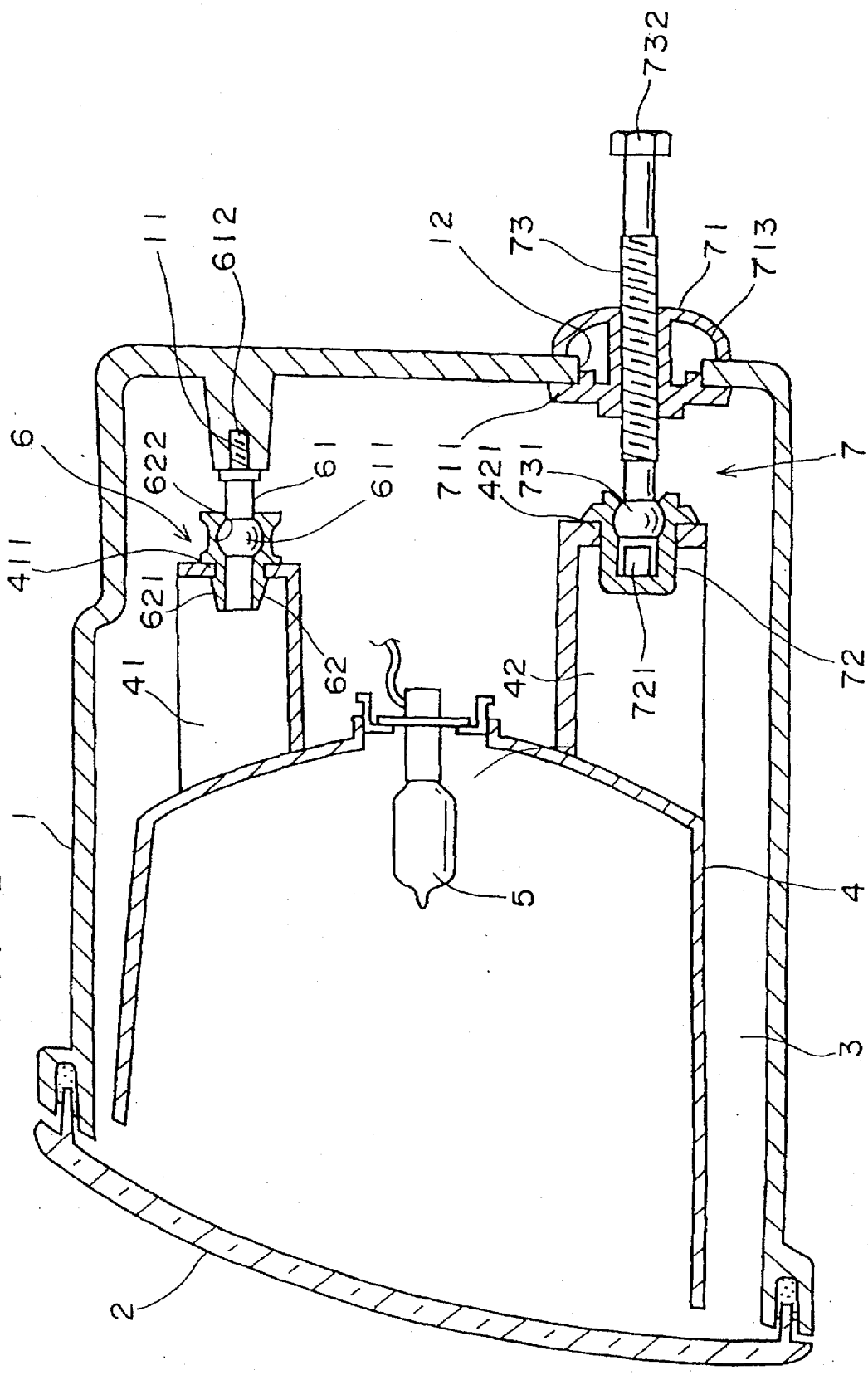
FIG. 1 is a longitudinal sectional view showing an automotive headlamp to which the present invention is applied.

FIG. 1 is a longitudinal sectional view showing an automotive headlamp to which the present invention is applied. A vessel like lamp body 1 is formed by resin molding process. An outer lens 2 is coupled to a front opening of the lamp body 1 to define a lamp chamber 3. A reflector 4 is installed within the lamp chamber 3 and a lamp bulb 5 serving as a light source is supported on the reflector 4. The reflector 4 is pivotably supported by a ball joint section 6 disposed on a part of the back surface thereof so that the reflector 4 is allowed to pivot in the vertical and horizontal directions around the ball joint section 6 performing as a fulcrum. A vertical aiming adjustment section 7 and a horizontal aiming adjustment section, not shown, are disposed at positions opposite the ball joint section 6 in the vertical and horizontal directions, respectively.

The ball joint section 6 is constituted by a ball pivot member 61 secured to an inner surface of the lamp body 1 facing the back surface of the reflector 4 and a ball receptacle member 62 secured to a bracket 41 projecting from the back surface of the reflector 4. The ball pivot member 61 is provided with a ball part 611 at an end thereof and a threaded part 612 at a base end thereof. The threaded part 612 of the ball pivot member 61 screw-engages with a screw hole 11 formed in the inner surface of the lamp body 1. The ball receptacle member 62, which is rectangular in outer contour, has a clip part 621 at a base end thereof and a spherical receptacle part 622 at the other end thereof. The ball joint section 6 becomes integral with the reflector 4 by fitting the clip part 621 in a rectangular fitting hole 411 formed in the bracket 41, the ball joint structure is provided by engaging the ball part 611 of the ball pivot 61 with the receptacle part 622. As a result, the reflector 4 is allowed to pivot in the vertical and horizontal directions around the ball joint section 6 as a fulcrum.

Figure 2:
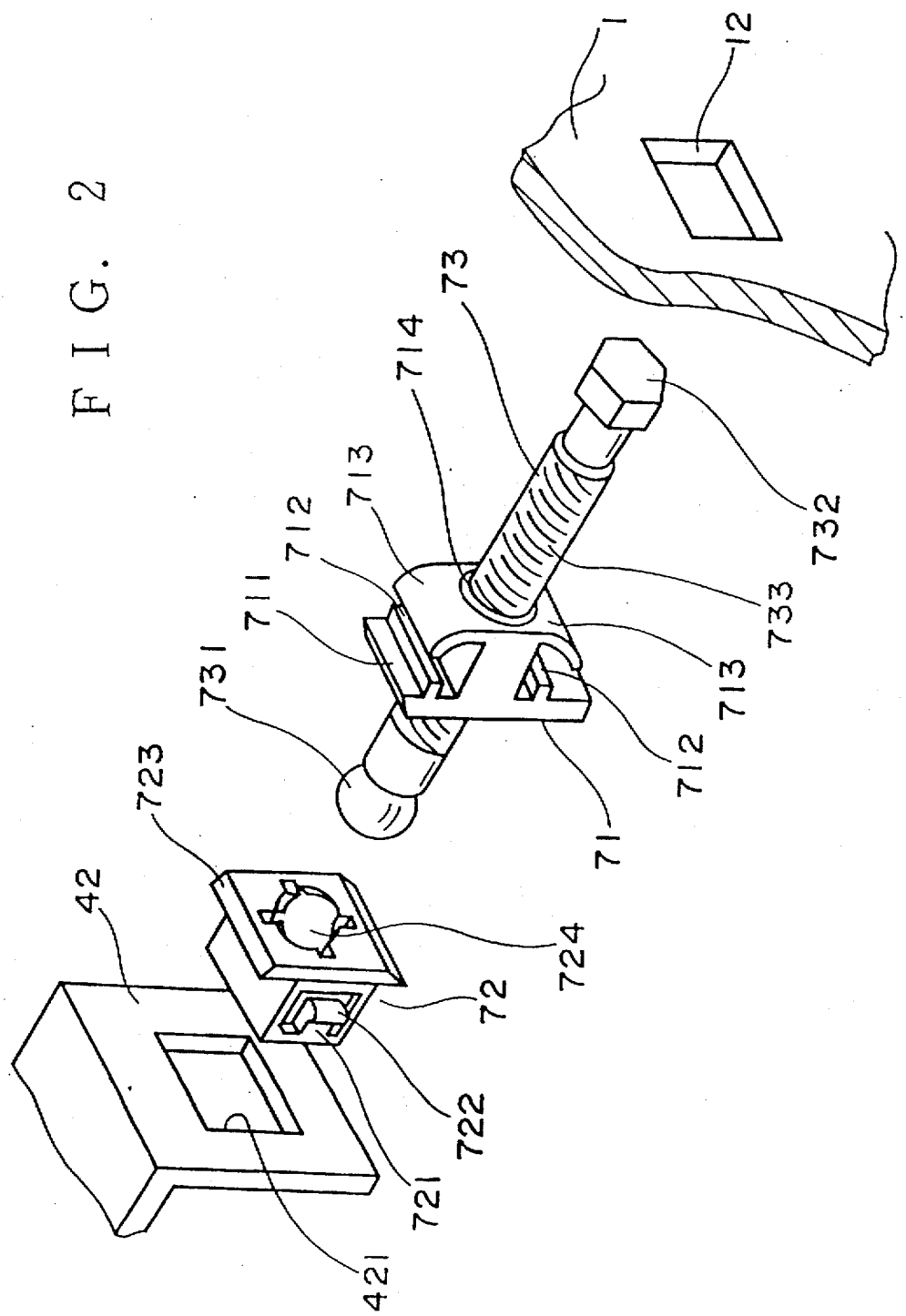
FIG. 2 is an exploded perspective view showing essential parts of the vertical aiming adjustment section.

FIG. 1 only shows the vertical aiming adjustment section 7, which is one of the vertical and horizontal aiming adjustment sections. FIG. 2 is an exploded perspective view showing essential parts of the vertical aiming adjustment section 7. A rectangular nut fitting hole 421 is formed in a bracket 42 projecting from the back surface of the reflector 4 at a position below the ball joint section 6. A ball receptacle member 72 is fitted in the fitting hole 421. On the other hand, a nut receiving hole 12 is formed in the lamp body 1 facing the nut fitting hole 421. A nut member 71 is fitted in the nut fitting hole 421.

A vertical aiming adjustment screw 73 screw-engages with the nut member 71 in such a manner that the vertical aiming adjustment screw 73 penetrates the lamp body 1 inwardly and outwardly. The vertical aiming adjustment screw 73 is provided at an inner end thereof with a ball part 731 having a diameter larger than that of a thread diameter of an intermediate part 733 thereof. The ball part 731 engages with the ball receptacle member 72. The vertical aiming adjustment screw 73 is also provided at an outer end thereof with a hexagonal operating part 732 having a diameter larger than that of a thread diameter of the intermediate part 733 thereof.

The basic structure of the ball receptacle member 72 is the same as that of the ball receptacle member 62 of the ball joint section 6. However, the ball receptacle member 72 is rectangular in outer contour in the present embodiment, and formed integrally with a pair of tongue like engagement pieces 721 at both side surfaces thereof each having a protrusion 722 integrally formed at an outer surface thereof. Further, the ball receptacle member 72 is also provided with a pair of engagement part 723 extending outward from both the outer surfaces of the tip end part thereof. A ball receptacle part 724, which is spherical recess, is formed at an end portion of the tip end side of the ball receptacle member 72.

When the base end part of the ball receptacle member 72 is fitted in the rectangular nut fitting hole 421 formed in the bracket 42, inner edge of the nut fitting hole 421 is held between the paired protrusions 722 and the engagement parts 723 of the engagement pieces 721, so that the ball receptacle member 72 is securely supported in the nut fitting hole 421.

The nut member 71 is constituted so called as a self-locking nut. The outer contour of the nut member 71 is rectangular having an outer diameter larger than that of the operating part 732 of the vertical aiming adjustment screw 73. A rectangular flange 711 extending outward in the vertical direction is integrally formed at a base end part of the nut member 71. A pair of engagement protruding parts 712 are formed on an inner surface of the flange 711. A pair of wing pieces 713 is formed at the tip end part of the nut member 71. The wing piece 713 is arcuate or linear (arcuate in the present embodiment). A threaded hole 714 is formed through the nut member 71 with which hole the vertical aiming adjustment screw 73 engages.

When the tip end part of the nut member 71 is fitted in the nut receiving hole 12 formed in the lamp body 1 from the inner side of the lamp body, the pair of wing pieces 713 comes into resiliently contact with an outer surface of the lamp body 1, so that an inner edge of the lamp body is held between the wing pieces 713 and the rectangular flange 711, thereby to fixedly support the nut member 71 itself in the nut receiving hole 12.

When the vertical aiming adjustment screw 73 screw-engages with the threaded hole 714 of the nut member 71 and the ball part 731 of the vertical aiming adjustment screw 73 is fitted in the ball receptacle member 72 in the lamp body 1, the operating part 732 projects out of the lamp body 1. When the vertical aiming adjustment screw 73 is operated by rotating the operating part 732 thereof, the vertical aiming adjustment screw 73 moves in the axial direction thereof relative to the nut member 71, i.e, the lamp body 1.

As a result, the ball receptacle member 72 in which the ball part 731 is fitted, i.e., the reflector 4, moves in the front-rear direction of the lamp body. Hence, the reflector 4 pivots in the vertical direction around the ball joint section 6 as a fulcrum.

Though not described here, the horizontal aiming adjustment section has the same structure and the same function except that it is located in the horizontal direction of the ball joint section 6.

The vertical aiming adjustment screw 73 (or horizontal aiming adjustment screw) is formed with the ball part 731 at the tip end part thereof having a diameter larger than that of the threaded part 733 and the operating part 732 at the base end part thereof having the outer diameter larger than that of the threaded intermediate part 733. The nut member 71 screw-engages with the threaded intermediate part 733 to position between the ball part 731 and the operating part 732. In order to accomplish the structure of the aiming adjustment screw 73, according to the present embodiment, the nut 71 is molded integrally with the aiming adjustment screw 73 while engaging therewith.

Figure 3:
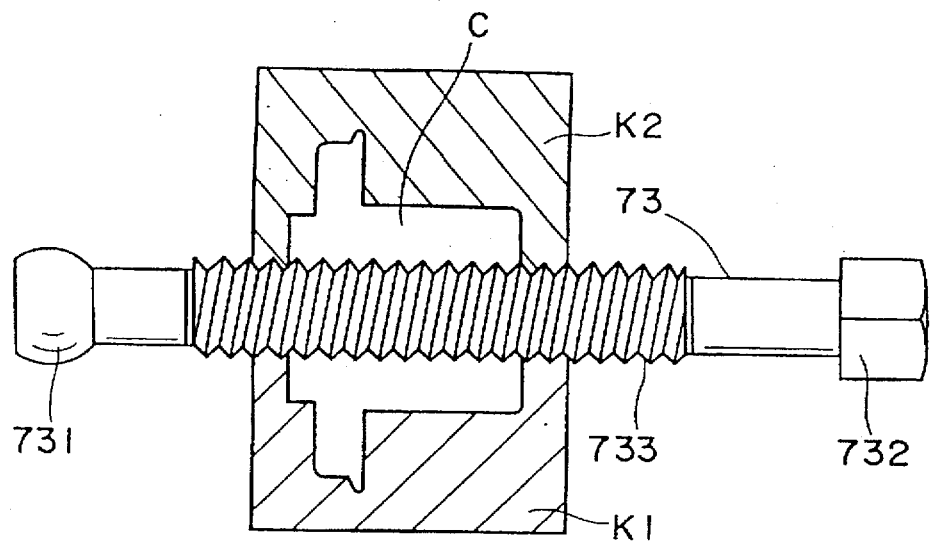
FIG. 3 is a schematic view showing the method for molding the nut member according to the present invention.

FIG. 3 is a schematic view showing the method for molding the nut member 71. After forming the aiming adjustment screw 73 by metal forging or grind processing, the aiming adjustment screw 73 is installed in a lower mold die K1 for molding the nut member. Before installing the aiming adjustment screw 73, oil or other material having a low adhesibility with resin is applied to a surface of the threaded part 733. Then, an upper mold die K2 is mounted on the lower mold die K1 to thereby define a cavity C, and fused resin material is injected into the cavity C.

After the resin is solidified, the upper mold die K2 is removed and then the aiming adjustment screw 73 is detached from the lower mold die K1, so that the nut member 71 is molded in such a manner that the nut member 71 is integrally formed with the aiming adjustment screw 73 while engaging with the threaded intermediate part 733 thereof as shown in FIG. 2.

After the molding process, when the nut member 71 is rotated with respect to the aiming adjustment screw 73, the nut member 71 is readily detached from the aiming adjustment screw 73 owing to the oil which is previously applied, thereby to allow the nut member 71 to rotate relative to the aiming adjustment screw 73.

Figure 4A:
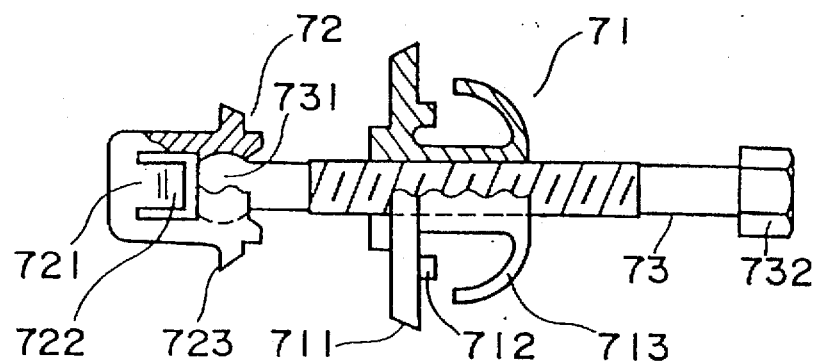
FIGS. 4A, 4B and 4C are enlarged view for explaining the steps of assembling the aiming adjustment screw and the nut member according to the invention.
Figure 4B:
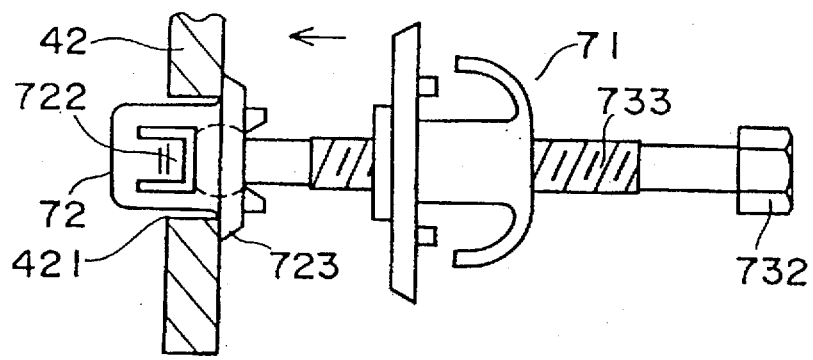
Figure 4C:
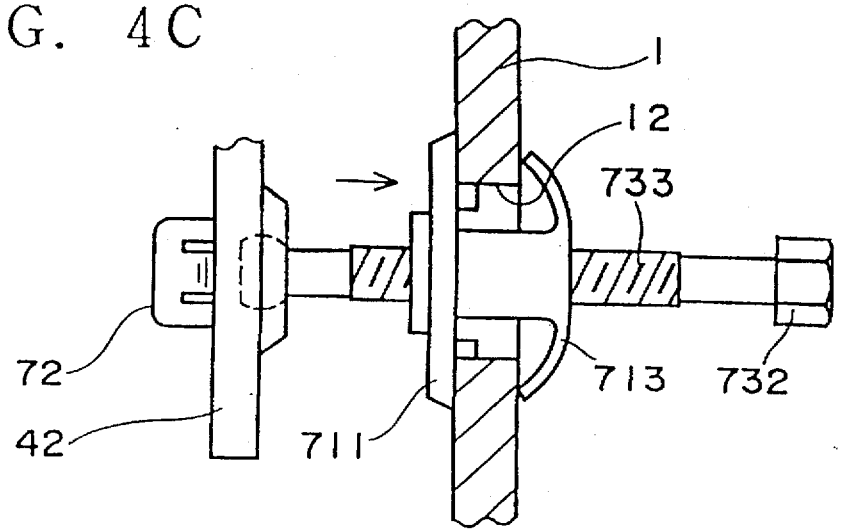

When the lamp shown in FIG. 1 is assembled using the aiming adjustment screw 73 and the nut member 71 thus molded, first, as shown in FIG. 4A, the ball part 731 of the aiming adjustment screw 73 which is integrally formed with the nut member 71 engages with the ball receptacle member 72. Next, as shown in FIG. 4B, the ball receptacle member 72 is fitted in the fitting hole 421 formed in the bracket 42 of the reflector 4. Afterwards, as shown in FIG. 4C, the reflector 4 is installed within the lamp body 1 and, at the same time, the operating part of the aiming adjustment screw 73 is inserted through the nut receiving hole 12 of the lamp body 1, so that the nut member 71 is engaged with the nut receiving hole 12.

As a result, the wing pieces 713 of the nut member 71 is fitted in the nut receiving hole 12 so that the nut member 71 is fixedly engaged with the nut receiving hole 12. Accordingly, the aiming adjustment screw 73 and the nut member 71 are supported by the lamp body 1, and the aiming adjustment section (vertical aiming adjustment section 7) is assembled.

As described above, the required steps for assembling the aiming adjustment section are extremely decreased and, therefore, the workability can be improved. In this case, when the vertical aiming adjustment section 7 is assembled, the horizontal aiming adjustment section may be assembled at the same time by inserting the nut member of which is inserted in the respective nut receiving hole to be supported by the lamp body. Accordingly, the required number of assembling steps can be reduced compared with a case where each of the adjustment sections is separately assembled.

With the structure of the aiming adjustment section as described above, since an outer dimension of the operating part 732 of the aiming adjustment screw 73 is larger than the threaded intermediate part of the screw, it is easy to operate the aiming adjustment screw 73 to rotate during the aiming adjustment operation. Further, the outer diameter of the ball part 731 is larger than the diameter of the threaded part of the screw, large contact area of the ball part 731 with the ball receptacle member 72 can be obtained thereby to reduce the surface pressure therebetween. For this reason, particularly the abrasion of the inner surface of the ball receptacle part 724 can be suppressed, and stable ball supporting condition can be accomplished for a long time period.

Figure 5A:
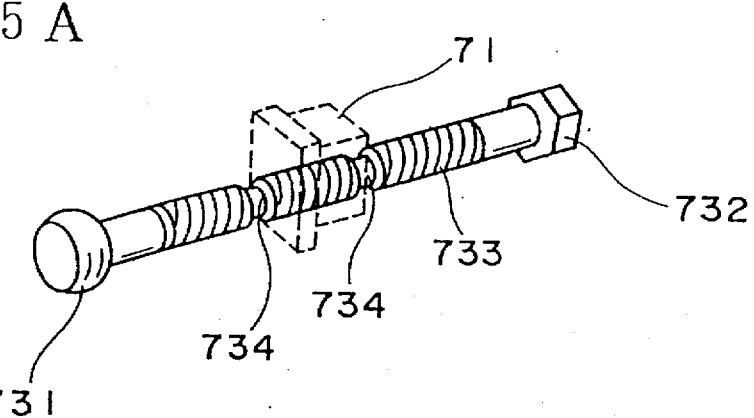
FIG. 5A is a perspective view of the aiming adjustment screw according to one arrangement.
Figure 5B:
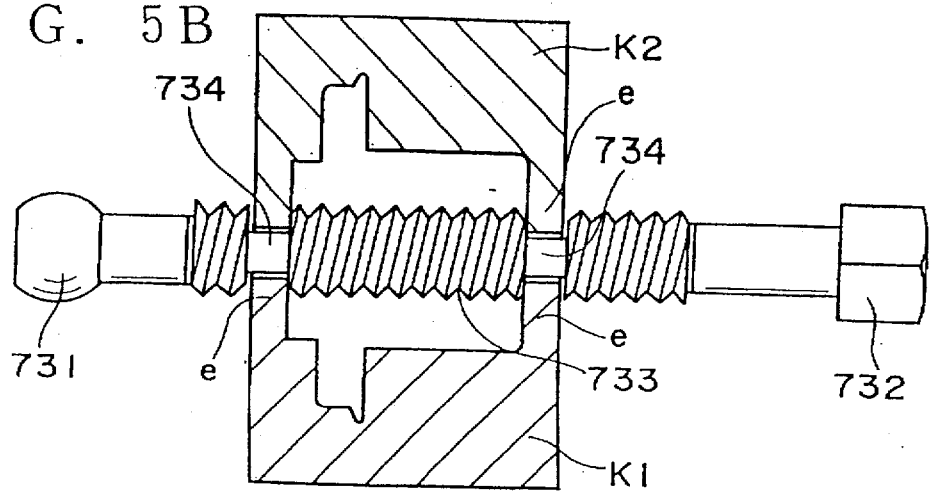
FIG. 5B is a schematic view showing the method for molding the nut member according to an arrangement of the present invention.

When the nut member is integrally resin-molded with the aiming adjustment screw, the molded method shown in FIG. 3 may be suffered from a problem in that resin may leak from a gap defined between the surface of the threaded intermediate part 733 and the mold dies K1 and K2, which may cause a burr or the like at an end part of the nut member. This is because that since the threaded part has a spiral groove there must be a gap along the groove between the flat mold die. In order to avoid such a problem, as shown in FIG. 5A, two parts of the threaded part 733 of the aiming adjustment screw 73, which correspond to both the ends of the nut member are not threaded to form small diameter parts 734. By forming the small diameter parts 734, as shown in FIG. 5B, edge parts e of the mold dies K1 and K2 extend inner than the diameter of the threaded intermediate part 733 and, accordingly, no gap would be defined between the mold dies K1 and K2 and the aiming adjustment screw 73. Further, with this arrangement, it is not necessary to form a spiral groove corresponding to the threaded intermediate part 733 at the mating surface of the mold dies K1 and K2. Therefore, the mold dies themselves can be produced simply.

Figure 6:
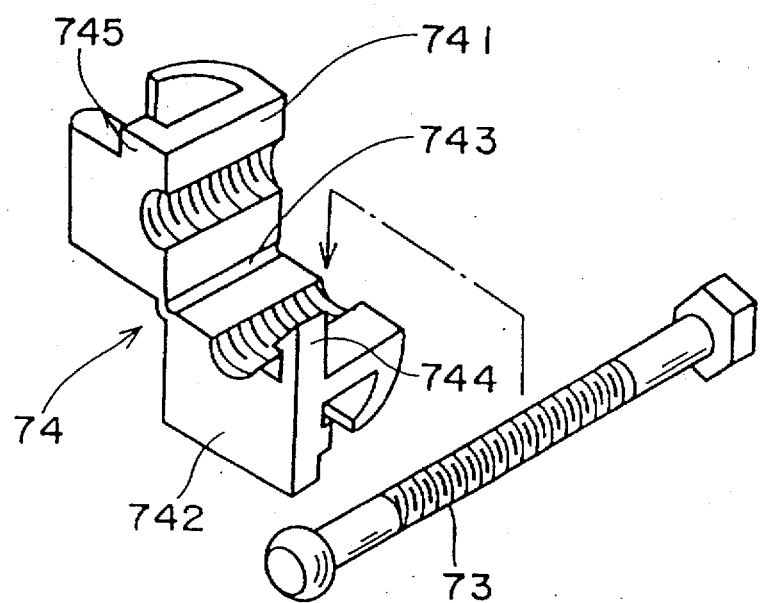
FIG. 6 is a perspective view showing a modified nut member and an aiming adjustment screw.
Figure 7:
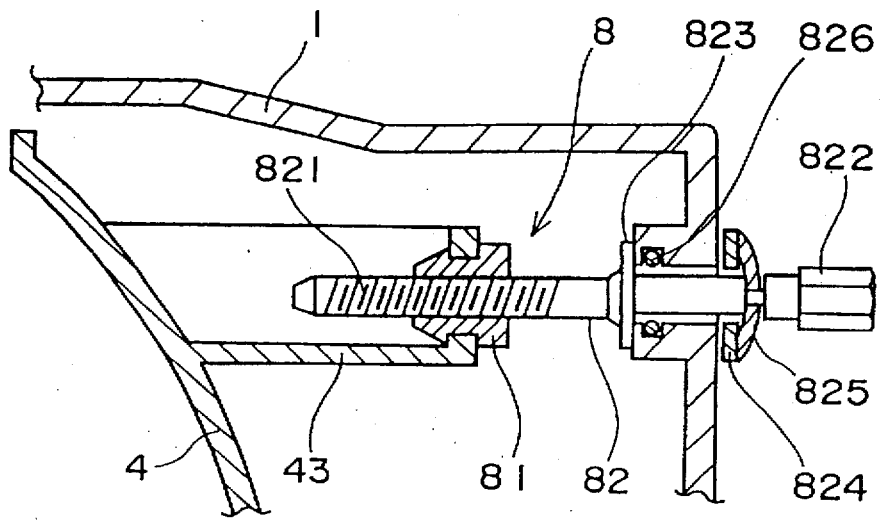
FIG. 7 is a schematically sectional view showing the conventional aiming adjustment section using the aiming adjustment screw.

According to the present invention, the other method for integrally forming the aiming adjustment screw with the nut member may be applied. For example, a nut member is constituted by two pieces divided along the longitudinal direction thereof, and the two pieces mate each other while sandwiching the aiming adjustment screw and then adhered to each other. Still another method may be employed in which, as shown in FIG. 6, a nut member 74 is molded to be divided into two pieces 741, 742 which are connected to each other by a connecting hinge section 743. The pieces 741 and 742 are provided with engagement pieces 745 and 744, respectively, which engage with each other by bending one of them at the connecting hinge section 743 while sandwiching the aiming adjustment screw 73. With the nut structure of this type also, the nut member 74 is previously integrated with the aiming adjustment screw 73 so that the foregoing advantages can be achieved.

The above embodiment shows, as one example, one type of automotive lamps in which a reflector is movable with respect to a lamp body and the reflector is inclinable by means of an aiming adjustment screw. However, the invention is not limited thereto or thereby. For example, the aiming adjustment screw may be applied to an automotive lamp of unit movable type in which a lamp unit which is attached to a vehicle body is inclinable by means of the aiming adjustment screw.

As described above, according to the present invention, since the outer dimension of the operating part of the aiming adjustment screw is designed to be larger than the threaded intermediate part of the screw and the outer diameter of the ball part 731 is larger than the diameter of the threaded part of the screw, while the nut member is integrally molded with the aiming adjustment screw at the intermediate part thereof, the aiming adjustment screw can be supported only by engaging the nut member with the stationary member and, further, no washer or O-ring is required, the required steps for assembling the aiming adjustment section are extremely decreased and, therefore, the workability can be improved. In addition, it is easy to operate the aiming adjustment screw to rotate during the aiming adjustment operation.

It should be understood that the form of the invention herein shown and described is to be taken as a preferred example of the invention and that various changes in the shape, size and arrangement of parts may be resorted to without departing from the spirit of the invention or the scope of the subjoined claims.

What is claimed is:

1. A structure for adjusting an optical axis of a lamp, comprising:
    a stationary member which is stationary within the lamp;
    a movable member which is movable within the lamp;
    a single piece optical axis adjustment screw comprising:
        a first end portion engaging with said stationary member;
        a second end portion operable by rotating; and
        an intermediate threaded portion,
        a nut member rotatably engaging said intermediate threaded portion of said optical axis adjustment screw, wherein said first and second end portions of said optical axis adjustment screw have an outer radial dimension which is larger than that of said intermediate threaded portion of said optical axis adjustment screw, and wherein said nut member is integrally formed with said optical axis adjustment screw.

2. The optical axis adjustment structure according to claim 1, wherein said nut member is integrally molded with said optical axis adjustment screw.

3. The optical axis adjustment structure according to claim 1, wherein said nut member is divided into two pieces along the longitudinal direction thereof.

4. The optical axis adjustment structure according to claim 3, wherein said two pieces of said nut member are connected to each other by a connecting hinge section.

5. The optical axis adjustment structure according to claim 1, further comprising a receptacle member fitted in a hole formed in said movable member, and said first end of said optical axis adjustment screw engages with said receptacle member.

6. The optical axis adjustment structure according to claim 1, wherein said first end portion comprises a ball part.

7. The optical axis adjustment structure according to claim 1, wherein said second end portion comprises a hexagonal operating part.

8. The optical axis adjustment structure according to claim 1, wherein said nut member comprises:
    a base end portion;
    a flange portion extending outward which is integrally formed at said base end portion;
    at least one of engagement protruding portion formed on an inner surface of said flange; and
    at least one wing piece formed at a tip end part.

9. The optical axis adjustment structure according to claim 1, wherein said wing piece is arcuate.

10. The optical axis adjustment structure according to claim 1, wherein said wing piece is linear.

11. The optical axis adjustment structure according to claim 1, wherein said optical axis adjustment screw comprises a pair of non-threaded small diameter part at positions corresponding to both the ends of said nut member.

12. The optical axis adjustment structure according to claim 1, wherein said stationary member comprises a lamp body and said movable member comprises a reflector.

13. The optical axis adjustment structure according to claim 1, wherein said movable member comprises a lamp unit.

14. A method for assembling an optical axis adjustment device, comprises steps of:
    integrally forming a single piece aiming adjustment screw with a nut member, said aiming adjustment screw including a first end portion, a second end portion, and an intermediate threaded portion;
    engaging said first end portion of said aiming adjustment screw with a receptacle member, wherein said first end portion of said aiming adjustment screw has an outer radial dimension which is larger than that of an intermediate threaded portion of said aiming adjustment screw;
    fitting said receptacle member in a fitting hole formed in a bracket of a movable member;
    inserting a second end portion of said aiming adjustment screw through a nut receiving hole formed in a stationary member, wherein said second end portion of said aiming screw has an outer radial dimension which is larger than that of said intermediate threaded part of said aiming adjustment screw; and
    engaging said nut member with said nut receiving.

15. The optical axis adjustment device assembling method according to claim 14, further comprising a step of, before said second end portion inserting step, installing said movable member within said stationary member.

16. The optical axis adjustment device assembling method according to claim 14, further comprising a step of, after said nut member engaging step, engaging wing pieces of said nut member in said nut receiving hole.

17. The optical axis adjustment device assembling method according to claim 14, wherein said nut member is integrally molded with said aiming adjustment screw.

18. The optical axis adjustment device assembling method according to claim 14, further comprising a step of, before said a first end portion engaging step, mating two pieces of said nut member which are divided into two pieces along the longitudinal direction thereof while sandwiching said aiming adjustment screw.

19. The optical axis adjustment device assembling method according to claim 14, wherein said first end portion comprises a ball portion and said second end portion comprises a hexagonal operating portion.

20. The optical axis adjustment device assembling method according to claim 14, wherein said nut member comprises:
    a base end portion;
    a flange portion extending outward which is integrally formed at said base end part;
    at least one of engagement protruding portion formed on an inner surface of said flange; and
    at least one wing pieces formed at a tip end portion.

21. The optical axis adjustment device assembling method according to claim 14, wherein said aiming adjustment screw comprises a pair of non-threaded small diameter portions at positions corresponding to both the ends of said nut member.

* * * * *

UNITED STATES PATENT AND TRADEMARK OFFICE
CERTIFICATE OF CORRECTION

PATENT NO.   : 5,743,618
DATED        : April 28, 1998
INVENTOR(S)  : Yuji FUJINO et al.

It is certified that error appears in the above-identified patent and that said Letters Patent is hereby corrected as shown below:

Column 7, line 67, change "claim 1" to --claim 8--.

Column 8, line 2, change "claim 1" to --claim 8--.

Signed and Sealed this

Twenty-third Day of March, 1999

Attest:

Q. TODD DICKINSON

*Attesting Officer*        *Acting Commissioner of Patents and Trademarks*